United States Patent
Yang (10) Patent No.: US 7,894,518 B2
(45) Date of Patent: Feb. 22, 2011

(54) MOTION ESTIMATION CIRCUIT AND MOTION ESTIMATION PROCESSING ELEMENT

(75) Inventor: Hsing-Chien Yang, Taichung (TW)

(73) Assignee: Novatek Microelectronic Corp., Hsinchu (TW)

( * ) Notice: Subject to any disclaimer, the term of this patent is extended or adjusted under 35 U.S.C. 154(b) by 1373 days.

(21) Appl. No.: 11/308,388

(22) Filed: Mar. 21, 2006

(65) Prior Publication Data

US 2007/0110164 A1  May 17, 2007

(30) Foreign Application Priority Data

Nov. 15, 2005  (TW) .............................. 94140034 A (51) Int. Cl.
*H04N 7/12* (2006.01)
(52) U.S. Cl. ............................ 375/240.01; 375/240.26; 375/240.24
(58) Field of Classification Search ............ 375/240.24, 375/240.26
See application file for complete search history.

(56) References Cited

U.S. PATENT DOCUMENTS

| | | | | |
|---|---|---|---|---|
| 5,235,537 | A * | 8/1993 | McWhirter et al. ......... | 708/200 |
| 5,696,836 | A | 12/1997 | Yoshino et al. | |
| 5,949,486 | A * | 9/1999 | Ishihara et al. ........... | 348/402.1 |
| 6,373,893 | B1 * | 4/2002 | Midorikawa ........... | 375/240.16 |
| 6,650,688 | B1 * | 11/2003 | Acharya et al. ............ | 375/141 |
| 7,245,651 | B1 * | 7/2007 | Miao et al. ................. | 375/147 |
| 2003/0016748 | A1 * | 1/2003 | Hwang et al. .......... | 375/240.12 |
| 2003/0198295 | A1 * | 10/2003 | Chen et al. ............. | 375/240.16 |
| 2004/0172433 | A1 * | 9/2004 | Acharya et al. ............. | 708/300 |
| 2005/0013366 | A1 * | 1/2005 | Gallant et al. .......... | 375/240.16 |
| 2005/0190844 | A1 * | 9/2005 | Kadono et al. ......... | 375/240.16 |
| 2005/0207494 | A1 * | 9/2005 | Ahn et al. ............... | 375/240.16 |
| 2005/0249284 | A1 * | 11/2005 | Lee et al. ................ | 375/240.16 |
| 2005/0286641 | A1 * | 12/2005 | Cao ....................... | 375/240.26 |
| 2006/0098740 | A1 * | 5/2006 | Byun et al. ............. | 375/240.16 |
| 2006/0120455 | A1 * | 6/2006 | Park et al. .............. | 375/240.16 |
| 2006/0203908 | A1 * | 9/2006 | Chuang .................. | 375/240.12 |
| 2007/0071101 | A1 * | 3/2007 | Topham .................. | 375/240.16 |
| 2007/0071107 | A1 * | 3/2007 | Ha ......................... | 375/240.24 |
| 2007/0110164 | A1 * | 5/2007 | Yang ....................... | 375/240.24 |

OTHER PUBLICATIONS

Yi-Jun Luo, Zhao-Yang Zhang, Pei-Liang Qiu, A Novel Optimized Structure of Landscape Orientation Filter, Journal of Circuits and Systems, Jul. 2000, pp. 22-25, vol. 5 No. 3, CN.

* cited by examiner

*Primary Examiner*—Chieh M Fan
*Assistant Examiner*—Santiago Garcia
(74) *Attorney, Agent, or Firm*—Jianq Chyun IP Office (57) ABSTRACT

A motion estimation circuit and a motion estimation processing element are provided. The latch module in the motion estimation circuit has n pieces of m-stage shift registers. Each shift register receives a current block data and transmits the received current block data to next stage according to a timing. The processing module has a plurality of processing elements (PEs), which are divided into (m+1) groups. The PEs of the i-th group receive the left search window data and the right search window data and are coupled to the input ends and the output ends of the i-th stage of latches, wherein $0 < i \leq m$. Each PE compares the similarity degree between the corresponding candidate block in the search window and the current block and outputs the processed result, respectively. The comparing unit receives and compares the processed results for outputting a first comparison result.

12 Claims, 9 Drawing Sheets

MOTION ESTIMATION CIRCUIT AND MOTION ESTIMATION PROCESSING ELEMENT

CROSS-REFERENCE TO RELATED APPLICATION

This application claims the priority benefit of Taiwan application serial no. 94140034, filed on Nov. 15, 2005. All disclosure of the Taiwan application is incorporated herein by reference.

BACKGROUND OF THE INVENTION

1. Field of Invention

The present invention relates to a motion estimation circuit, and particularly to a motion estimation circuit (ME circuit) and a motion estimation processing element (ME processing element), which combines both the advantage of a systolic array architecture featuring high efficiency of data reusing and the advantage of an adder-tree architecture featuring capability of simultaneously processing multi-point data in a clock cycle, so that high-efficient motion estimation operations are achieved.

2. Description of the Related Art

Conventional motion estimation circuit (ME circuit) architectures can be mainly categorized into an adder-tree architecture and a systolic array architecture. The architecture based on an adder-tree is mostly used to implement a three-step searching algorithm, a four-step searching algorithm, a diamond searching algorithm or other non-full searching algorithms. The hardware configuration of an architecture based on adder-tree features that a plurality of processing elements (PEs) is used to perform a parallel processing on the data required by an individual candidate motion vector (MV). However, the adder-tree architecture fails to simultaneously process a plurality of candidate MVs and thus the efficiency of data reusing is very low.

The systolic array architecture usually accomplish a full search algorithm or a hierarchy search algorithm. The architecture mainly features that it is able to simultaneously perform processing on a plurality of candidate MVs and uses the pipeline characteristic thereof for advancing the efficiency of data reusing and for reducing the bandwidth required by a data bus. Though a processing element in a conventional systolic array is able to compare two pixels in one clock cycle, it fails to perform a mapping processing on 16-point data or 32-point data simultaneously, which can be performed by the adder-tree architecture.

SUMMARY OF THE INVENTION

An object of the present invention is to provide a motion estimation circuit, which absorbs both the advantage of a systolic array architecture featuring high efficiency of data reusing and the advantage of an adder-tree architecture featuring capability of simultaneously processing multi-point data in a clock cycle, so that high efficient motion estimation operations are achieved.

Another object of the present invention is to provide a motion estimation processing element (MEPE), which has an adder-tree architecture and utilizes a plurality of operation circuits so as to enable performing parallel processing on the required data.

The present invention provides a motion estimation circuit (ME circuit) for searching a block most similar to the current block (CB) in a search window (SW), wherein the SW is formed by a left search window (left SW) and a right search window (right SW). The motion estimation circuit includes a latch module, a processing module and a comparing unit. The latch module has n pieces of shift registers and each shift register has m stages of latches, wherein each shift register would receive and transmit a current block data to next stage according to a timing sequence. Wherein, n is an integer larger than 1 and m is an integer larger than 0. The processing module has a plurality of processing elements and each processing element receives the left SW data and the right SW data. Wherein, the processing elements are divided into m+1 groups to couple the corresponding stage of latches in the shift registers, respectively. The processing elements of the i-th group are coupled to both the input ends and the output ends of the i-th stage latches, and i is an integer larger than 0 but smaller than or equal to m. Each processing element is used for comparing the similarity degree between a corresponding candidate block in a search window and the current block and outputs the processed result, respectively. The comparing unit is coupled to the processing module for receiving and comparing each processed result and then outputting a first comparison result.

According to the motion estimation circuit in the embodiments of the present invention, the above-described processing module receives the data of left SW, the data of right SW and the data of the current block for performing a sum of absolute difference (SAD) operation on a corresponding candidate block in the search window and the current block.

According to the motion estimation circuit in the embodiments of the present invention, the above-described comparing units are for receiving and comparing the processed results output from the processing elements according to a timing sequence, wherein the processed results represent similarity degrees between the current block and the corresponding candidate blocks. The comparing units would select and output the one with the most extent of similarity degrees from the processed results.

According to the motion estimation circuit in the embodiments of the present invention, the above-described comparing unit includes first selectors, a first comparator, a second selector and a latch comparator. Each of first selectors is for receiving and selecting the processed result output from the corresponding processing element in the processing elements of each group and for outputting the selected processed result. The first comparator is coupled to each of the first selectors for receiving and comparing the processed results selected by and output from each first selector and for further outputting a second comparison result. The second selector is coupled to the first comparator for receiving and selecting both the processed results output from the processing elements of the 0-th group and the second comparison result and for further outputting a selection result. The latch comparator is coupled to the second selector for receiving the selection result and for comparing the received selection result with the previous first comparison result registered in the latch comparator for outputting a current first comparison result.

The present invention further provides a motion estimation processing element (MEPE) for computing the similarity degree between the candidate block in a search window and the current block and for outputting a processed result, wherein the search window is formed by a left SW and a right SW. The MEPE includes n pieces of selectors, n pieces of operation circuits and an accumulation circuit, wherein n is an integer larger than 1. Each selector receives and selects the data of the left SW and the data of the right SW, respectively, and outputs the selected data, respectively. Each operation circuit is coupled to the corresponding selector for receiving the corresponding selected data and the data of the current block to perform an absolute difference (AD) operation and to output the operation result, respectively. The accumulation circuit is coupled to each of the operation circuits for receiving and accumulating every operation result and for further outputting the processed results.

According to the motion estimation processing element (MEPE) in the embodiments of the present invention, the above-described operation circuit includes a subtractor, a first multiplexer and an absolute value circuit. The subtractor receives selected data and the data of the current block and performs a subtraction operation for outputting the subtraction result. The first multiplexer is coupled to the subtractor for selecting one of data '0' and the subtraction result and for further outputting the selection result. The absolute value circuit is coupled to the first multiplexer for receiving the selection result and performing an absolute value operation and for further outputting the operation result.

According to the motion estimation processing element (MEPE) in the embodiments of the present invention, the above-described accumulation circuit includes a first adder and an accumulation latch circuit. The first adder receives each of the operation results and performs an addition operation for outputting a first sum value. The accumulation latch circuit is coupled to the first adder for receiving the first sum value and adding the received first sum value to the previous processed result registered in the accumulation latch circuit and for further outputting the current processed result.

According to the motion estimation processing element (MEPE) in the embodiments of the present invention, the above-described accumulation latch circuit includes a second multiplexer, a second adder and a flip-flop. The second multiplexer receives either data '0' or the processed result and selects one of them for outputting a selection result. The second adder receives the selection result and the first sum value for adding operation and for further outputting a second sum value. The flip-flop is coupled to the second adder for receiving and registering the second sum value and for further outputting a processed result.

Since the present invention absorbs both the advantage of a systolic array architecture featuring high efficiency of data reusing and the advantage of an adder-tree architecture featuring capability of simultaneously processing multi-point data in a clock cycle, therefore the present invention is able to reduce the operation time required by a conventional systolic array architecture, increase the efficiency of data reusing and accordingly reduce the bandwidth requirement for transmitting data. Accordingly, the goal of performing a high efficient motion estimation operation is achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
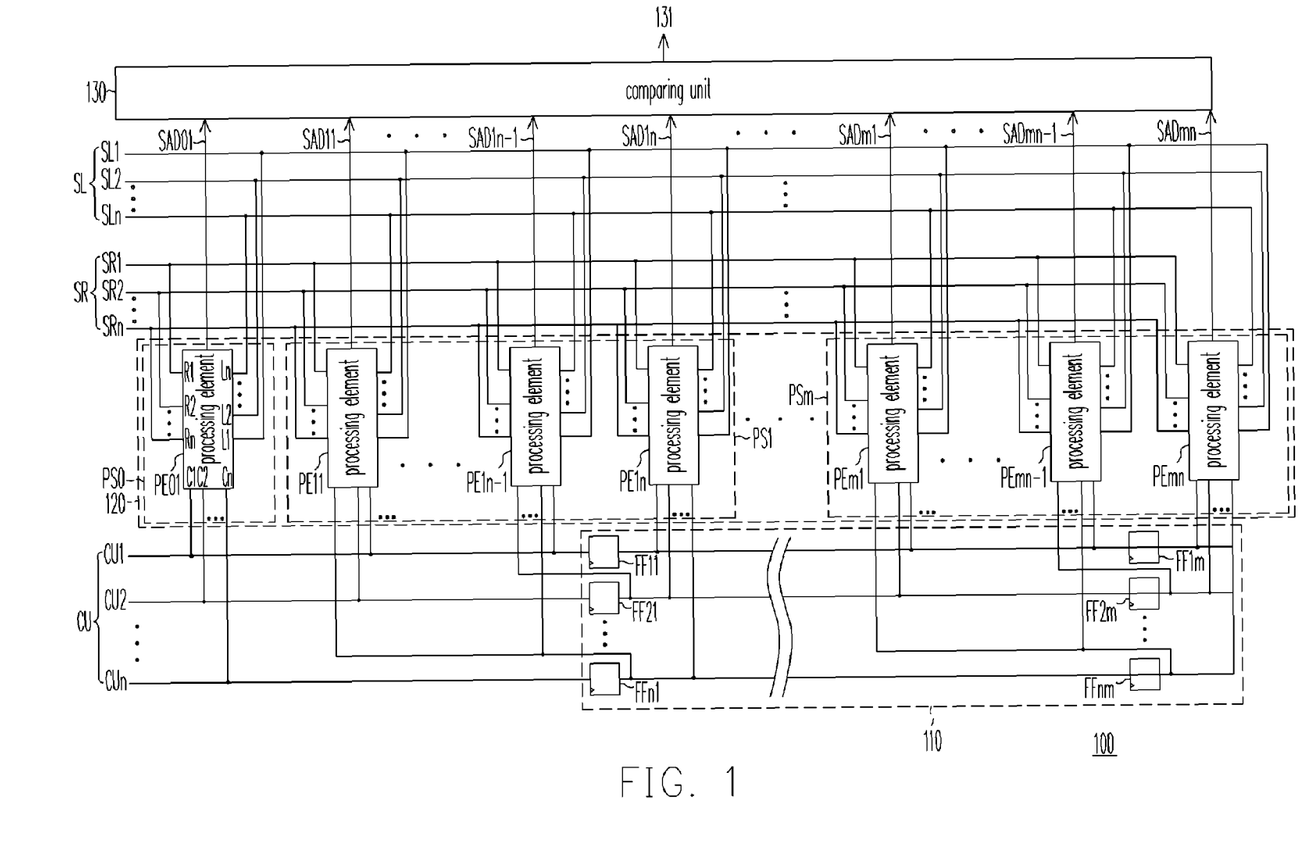
FIG. 1 is a schematic motion estimation circuit according to an embodiment of the present invention.

FIG. 1 is a schematic motion estimation circuit according to an embodiment. Referring to FIG. 1, a motion estimation circuit 100 is for searching a block in a search window (for example, the search window SW in FIG. 4) most similar to the current block (for example, the current block CU in FIG. 4). Wherein, the search window is formed by a left search window (for example, the left search window SL in FIG. 4) and a right search window (for example, the right search window SR in FIG. 4).

In the motion estimation circuit 100, a latch module 110 has n pieces of shift registers (n is an integer larger than 1) and each shift register has m stages of latches (m is an integer larger than 0). For example, the latches FF11~FF1m, the latches FF21~FF2m until the latches FFn1~FFnm form n pieces of m-th stage shift registers. Each shift register receives and transmits a current block data CU to next stage according to a timing, wherein every latch is a, for example, D-type flip-flop.

A processing module 120 is coupled between the latch module 110 and a comparing unit 130 for receiving the left search window data SL, the right search window data SR and the current block data CU, so as to perform similarity degree operations on a plurality of candidate blocks in the search window and the current block. The above-mentioned similarity degree operation herein is, for example, a sum of absolute difference operation (SAD operation). The processing module 120 has a plurality of processing elements PE01~PEmn, and each processing element simultaneously receives the left search window data SL and the right search window data SR. Each processing element can be divided into (m+1) groups, such as the 0-th group PS0, the $1^{st}$ group PS1 until the m-th group PSm as shown in FIG. 1. Wherein, the 0-th group PS0 directly receives the current block data CU, and the rest groups are coupled to both the output ends and the input ends of the corresponding stage of the latches in each shift register, respectively. For example, the processing elements PE11~PE1n of the $1^{st}$ group PS1 are coupled to both the output ends of the corresponding $1^{st}$ stage latches (i.e. FF11, FF21 ... FFn1) in all shift registers and the input ends thereof.

In more detail, in, the $1^{st}$ group (analogically for the rest groups), the first processing element PE11 is coupled to the input ends of from the $1^{st}$ latch FF11 to the latch FF(n−1)1 (not shown in the figure) of the $1^{st}$ stage latches and the output end of the latch FFn1 of the $1^{st}$ stage latches; the second processing element (not shown) is coupled to both the input ends of from the latch FF11 to the latch FF(n−2)1 (not shown) of the $1^{st}$ stage latches and the output ends of from the latch FF(n−1)1 (not shown) to the latch FFn1 of the $1^{st}$ stage latches and analogically for the rest. Therefore, the (n−1)-th processing element PE1 (n−1) is coupled to both the input end of the 1st latch FF11 and the output ends of from the 2nd latch FF21 to the n-th latch FFn1; finally, the n-th processing element PE1n is coupled to the output ends of from the 1st latch FF11 to the latch FFn1 of the 1st stage latches.

Every processing element according to a timing receives the corresponding current block data CU, the left search window data SL and the right search window data SR, then evaluate the similarity degrees between the corresponding candidate blocks in the search window and the current block and outputs the processed results SAD01~SADmn, respectively. The comparing unit 130 receives and compares the processed results SAD01~SADmn output from the processing module 120 and then outputs the comparison result 131. In other words, the comparing unit 130 receives and compares the processed results SAD01~SADmn output from the processing elements PE01~PEmn according to a timing, wherein the processed results SAD01~SADmn represent the similarity degrees between the current block and the corresponding candidate blocks, respectively. The comparing unit 130 chooses the one with the most extent of similarity degree from the processed results SAD01~SADmn.

Figure 2:
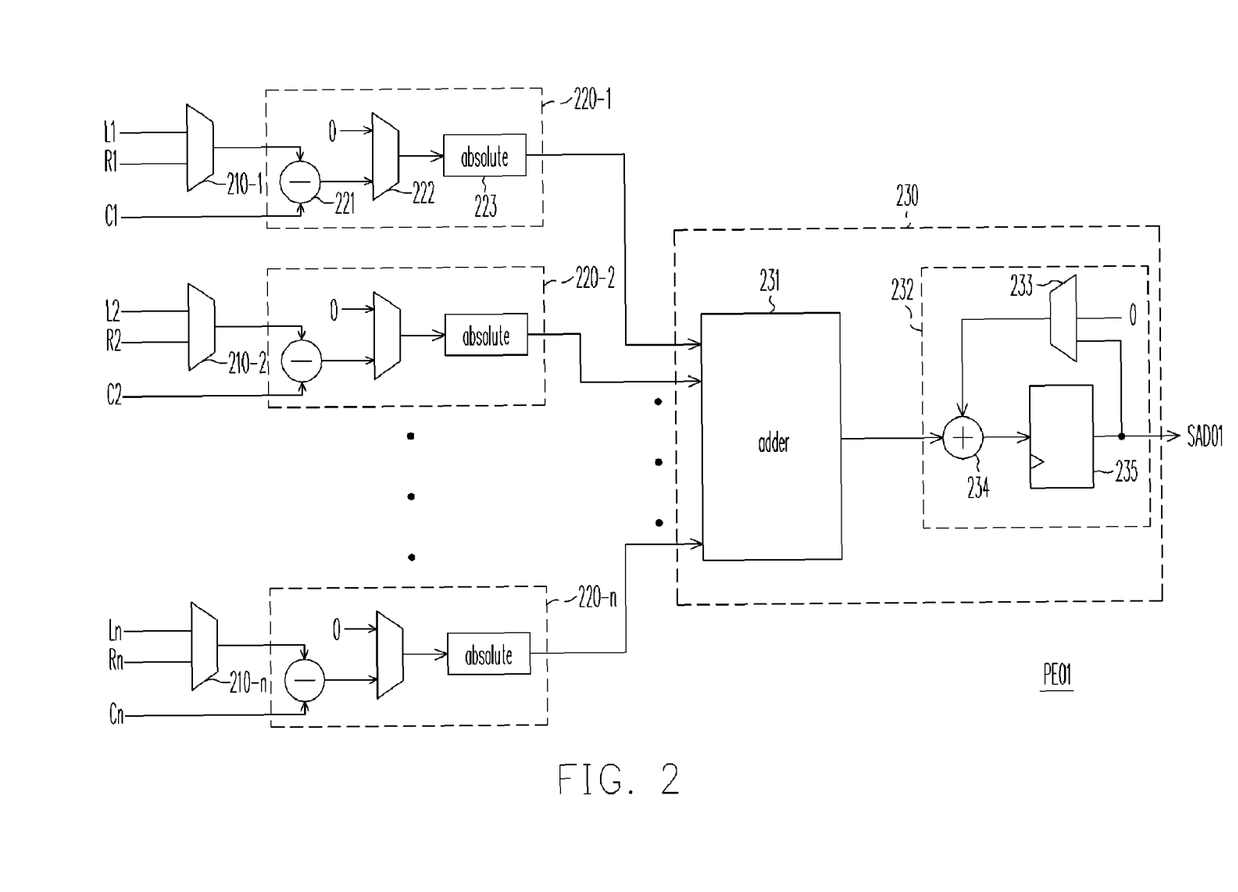
FIG. 2 is a circuit block diagram of a motion estimation processing element according to an embodiment of the present invention.

In the present embodiment, any processing element in the above-described processing elements PE01~PEmn can be implemented referring to FIG. 2, and for simplicity only the processing element PE01 is described hereinafter. FIG. 2 is a circuit block diagram of a motion estimation processing element according to an embodiment of the present invention. Referring to FIG. 2, a processing element PE01 includes selectors 210-1~210-n, operation circuits 220-1~220-n and an accumulation circuit 230. The selectors 210-1~210-n receive and select the data of the left search window SL (input from the input ends L1~Ln) and the data of the right search window SR (input from the input ends R1~Rn), respectively and then output the selected data, respectively.

The operation circuits 220-1~220-n receive the selected data output from the corresponding selectors and the current block data CU (input from the input ends C1~Cn) to perform absolute difference (AD) operations, respectively and output the operation results. The accumulation circuit 230 receives and accumulates all the operation results output from the operation circuits 220-1~220-n for outputting the processing result SAD01.

In the present embodiment, the above-described operation circuit (taking the operation circuit 220-1 as exemplary only) includes a subtractor 221, a multiplexer 222 and an absolute value circuit 223. The subtractor 221 receives both of the selected data from the selector 210-1 and the current block data input from the input end C1, followed by performing a subtraction operation on the two received data and outputting the subtraction result. The multiplexer 222 selects one of data '0' and the subtraction result from the subtractor 221 for outputting a selection result. The absolute value circuit 223 receives the selection result from the multiplexer 222, followed by performing an absolute value operation for outputting an operation result.

The above-described accumulation circuit 230 includes, for example, an adder 231 and an accumulation latch circuit 232. The adder 231 receives all the operation results from the operation circuits 220-1~220-n, followed by performing an addition operation for outputting a first sum value. The accumulation latch circuit 232 receives the first sum value from the adder 231 and the previous processed result registered in the accumulation latch circuit 232, followed by performing an addition operation for outputting the current processed result SAD01.

Wherein, the accumulation latch circuit 232 includes, for example, a multiplexer 233, an adder 234 and a flip-flop 235. The multiplexer 233 receives data '0' and the processed result SAD01 and selects one of them for outputting a section result. The adder 234 receives the selection result from the multiplexer 233 and the first sum value from the adder 231, followed by performing an addition operation for outputting a second sum value. The flip-flop 235 receives the second sum value from the adder 234 and according to a timing registers the received second sum value for outputting the processed result SAD01. In particular, after the processing element PE01 completes a mapping between a candidate block and the current block and outputs the processed result SAD01 and at the beginning to perform a comparison operation between the next candidate block and the current block, the multiplexer 233 selects data '0', so that the flip-flop 235 would directly register the first sum value from the adder 234 without resetting the internal memory status thereof.

Figure 3:
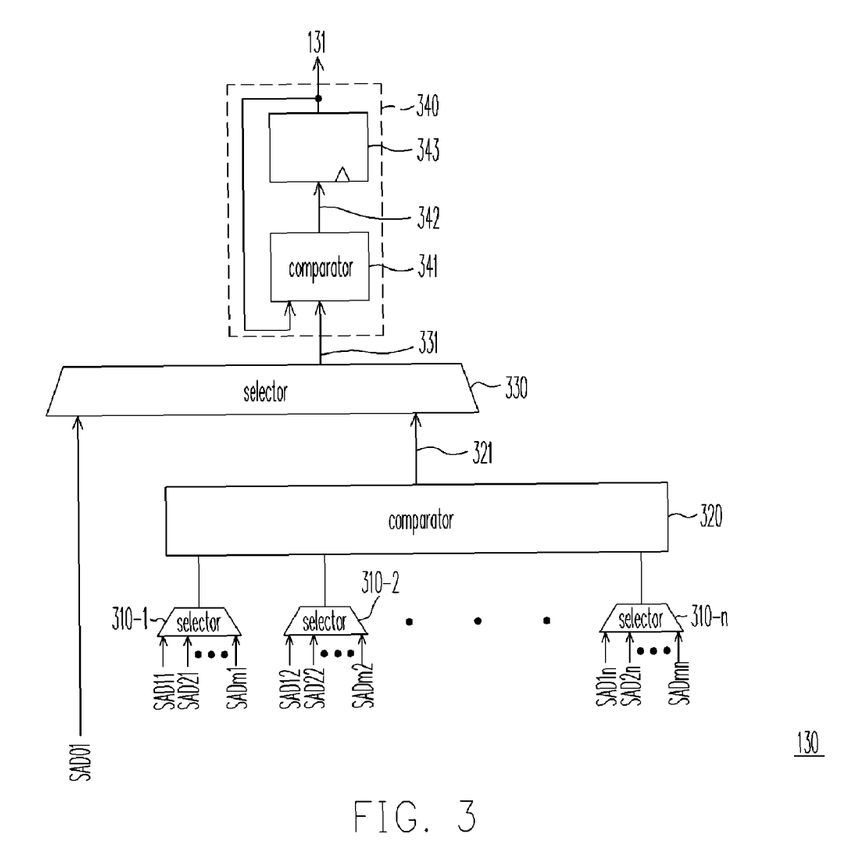
FIG. 3 is a circuit block diagram of the comparing unit in FIG. 1 according to an embodiment of the present invention.

In the present embodiment, the comparing unit 130 in FIG. 1 can be implemented referring to FIG. 3. FIG. 3 is a circuit block diagram of the comparing unit 130 in FIG. 1 according to an embodiment of the present invention. Referring to FIG. 3, the comparing unit 130 includes first selectors 310-1~310-n, a first comparator 320, a second comparator 330 and a latch comparator 340. Each of the first selectors 310-1~310-n receives and selects all the processed results output from the corresponding processing elements of every group of processing elements (except for the 0-th group PS0), followed by outputting the selected processed result. For example, the first selector 310-1 is coupled to the first processing elements of all the groups PS1~PSm of processing elements (i.e. the processing elements, PE11 . . . PEm1 in FIG. 1) and receives the processed results SAD11 . . . SADm1. Similarly, the first selector 310-n is coupled to the n-th processing elements of all the groups of all the processing elements PS1~PSm (i.e. the processing elements, PE1n . . . PEmn in FIG. 1) and receives the processed results SAD1n . . . SADmn.

The first comparator 320 receives and compares the processed results selected by and output from the first selectors 310-1~310-n for outputting a comparison result 321. For example, the first comparator 320 compares the processed results selected by and output from the first selectors 310-1~310-n to get a minimal value among all the processed results and outputs the minimal value. The second selector 330 receives and selects the processed result SAD01 and the comparison result 321 output from the processing element PE01 of the 0-th group (PS0 in FIG. 1) for outputting a selection result 331.

The latch comparator 340 receives the selection result 331 and compares the received selection result 331 with the previous comparison result 131 registered in the latch comparator 340 (for example taking the minimal one as the criteria) for outputting a current comparison result 131. The latch comparator 340 includes, for example, a second comparator 341 and a flip-flop 343. The second comparator 341 receives and compares the comparison result 131 and the selection result 331 for outputting a comparison result 342. The flip-flop receives the comparison result 342 and latches the comparison result 342 for outputting the comparison result 131 according to a timing.

Figure 4:
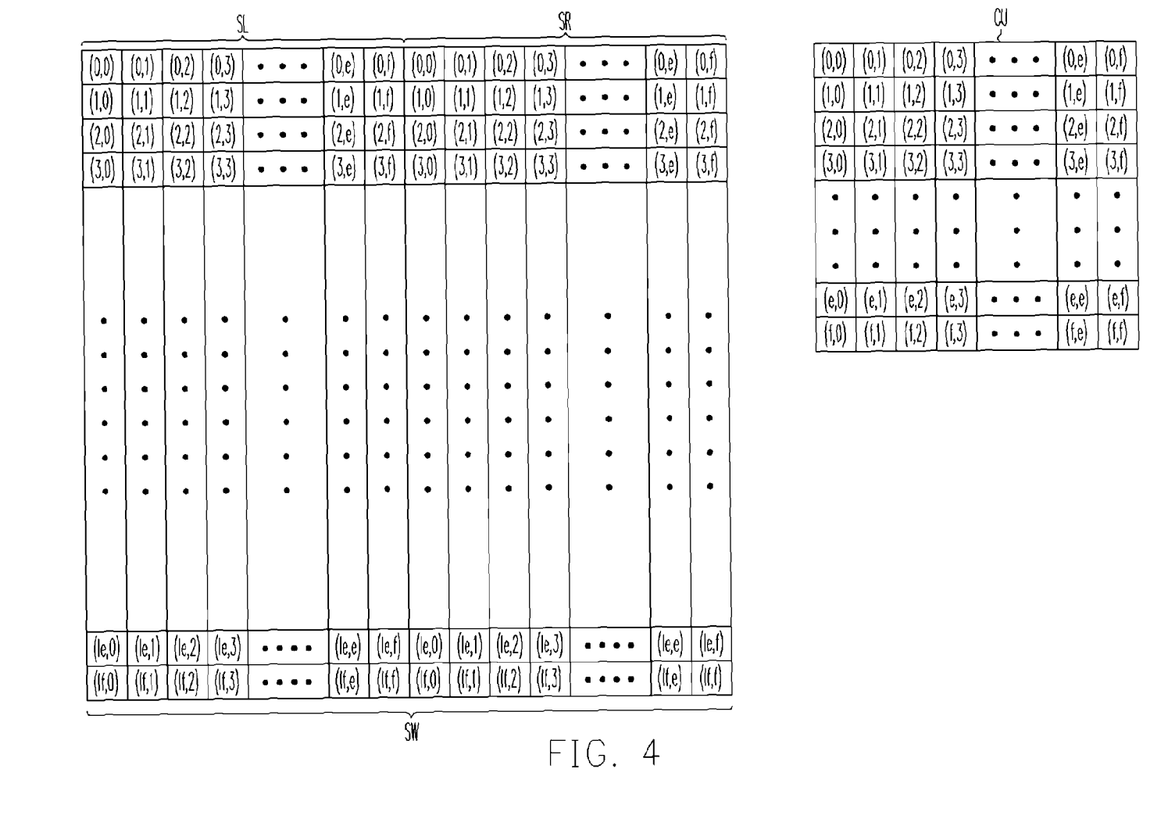
FIG. 4 is a diagram showing a 16×16 current block and a 32×32 search window according to the embodiment of the present invention.

In more detail, a 16×16 current block CU and a 32×32 search window SW are taken as exemplary to explain the present invention in FIG. 4. Wherein, the search window SW is formed by a left search window SL and a right search window SR and both the SL and the SR are a 16×32 block. Each box in FIG. 4 represents an element data of the block (for an image processing, each box represents a pixel data). The figure in each box (in hexadecimal format) represents a relative position coordinates in the block.

In the described example, both n and m in the above-described embodiment are assumed as 4, while to those skilled in the art, n and m can be set according to a practical requirement and are not limited to 4.

Figure 5A:
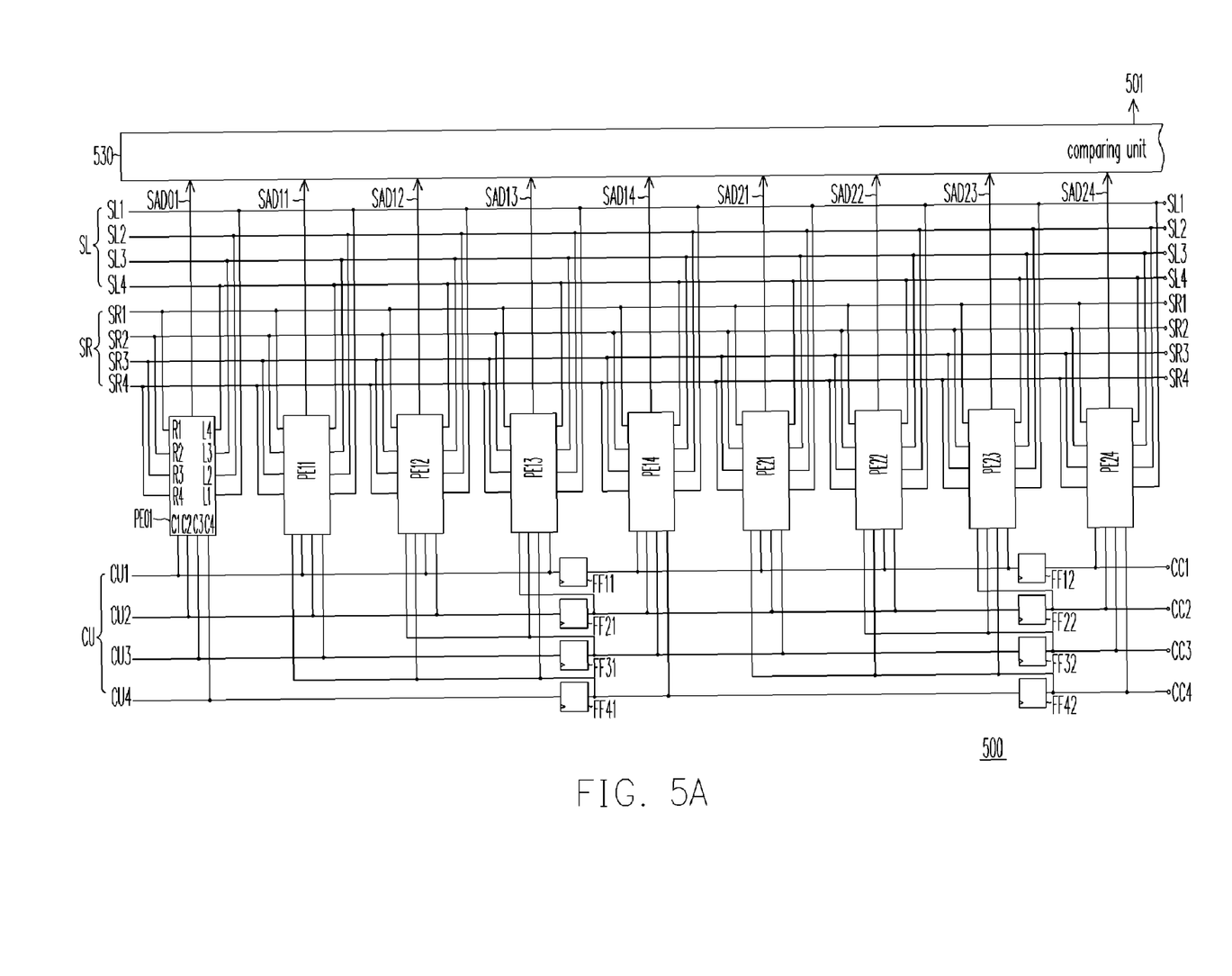
FIGS. 5A and 5B are schematic motion estimation circuits according to another embodiment of the present invention.
Figure 5B:
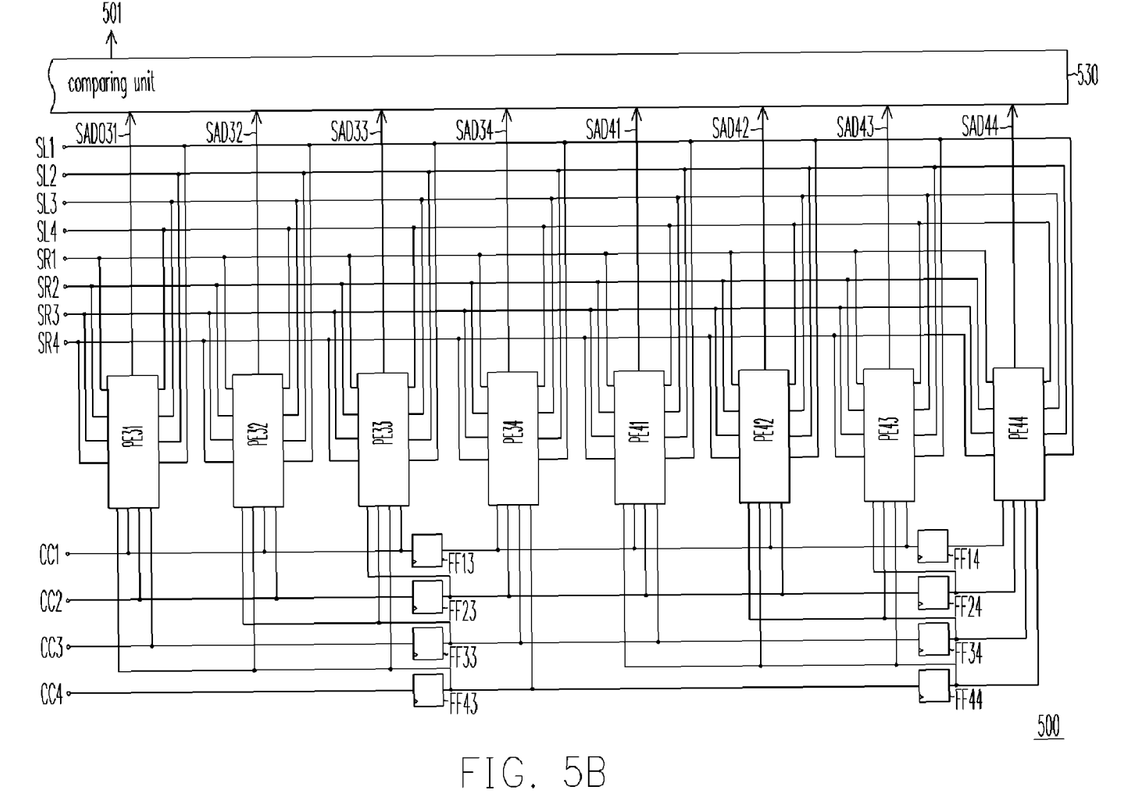
Figure 6:
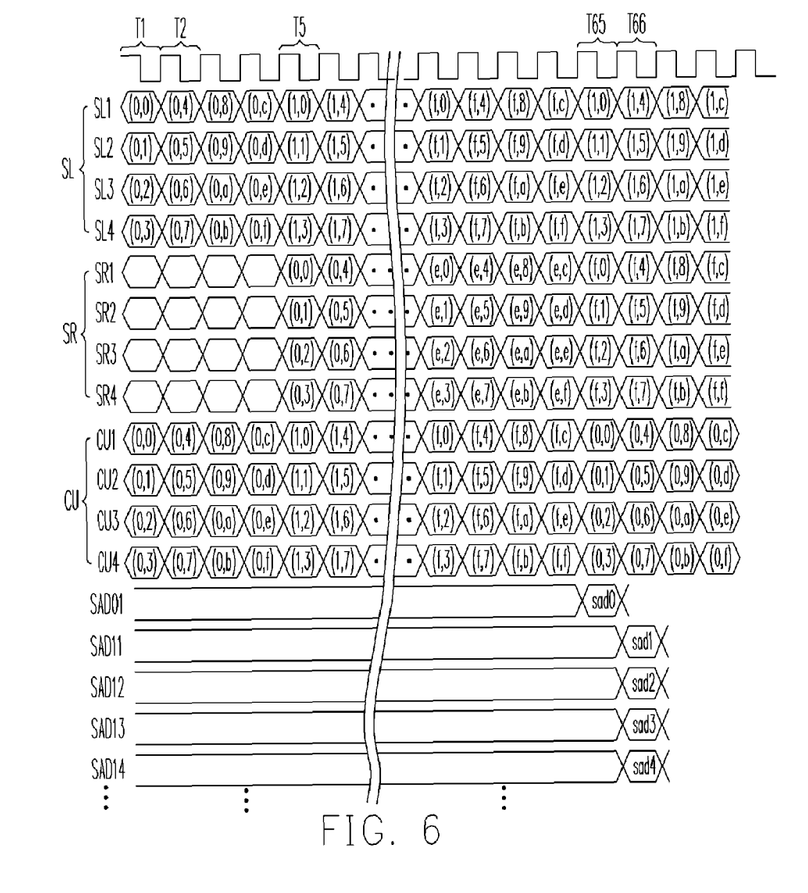
FIG. 6 is a timing diagram for feeding the search window data and the current block data in FIG. 4 into the schematic motion estimation circuit of FIGS. 5A and 5B.

Another motion estimation circuit embodiment of the present invention is described hereinafter. Since there are many components in the present embodiment, the schematic circuit drawing of the embodiment is divided into FIG. 5A and FIG. 5B for better illustration. In other words, FIG. 5A and FIG. 5B together illustrate the complete circuit of the second embodiment. FIG. 6 is a timing diagram for feeding the search window data and the current block data in FIG. 4 into the schematic motion estimation circuit 500 of FIGS. 5A and 5B. Referring to FIGS. 4, 5A, 5B and 6, processing elements PE01~PE44 perform similarity degree operations on the current block and the corresponding candidate blocks, respectively. For example, as scanning the current block CU for the first time, the processing element PE01 performs a similarity degree operation on the 16×16 current block CU and the 16×16 candidate block formed by (0,0)~(f,f) elements in the left search window SL; then, the processing element PE11 performs a similarity degree operation on the 16×16 current block CU and the 16×16 candidate block formed by (0,1)~(f,f) elements in the left search window SL and (0,0)~(f,0) elements in the right search window SR. And analogically for the rest, for example, the processing element PE44 performs a similarity degree operation on the 16×16 current block CU and the 16×16 candidate block formed by (0,0)~(f, f) elements in the right search window SR.

In the present embodiment, the left search window data SL, the right search window data SR and the current block data CU are parallel input into the motion estimation circuit 500 from the input ends SL1~SL4, SR1~SR4 and CU1~CU4, respectively, in a manner of four adjacent element data by four adjacent element data. For example, at timing T1, four element data of (0,0), (0,1), (0,2) and (0,3) in the left search window SL are parallel input into the motion estimation circuit 500 from the input ends SL1~SL4, respectively. Simultaneously, four element data of (0,0), (0,1), (0,2) and (0,3) in the current block CU are parallel input into the motion estimation circuit 500 from the input ends CU1~CU4, respectively. At timing T2, however, the element data of (0,4), (0,5), (0,6) and (0,7) in the left search window SL and the element data of (0,4), (0,5), (0,6) and (0,7) in the current block CU are parallel input into the motion estimation circuit 500 from the input ends SL1~SL4 and the input ends CU1~CU4, respectively, and analogically for the rest.

Once the first row data in the left search window SL has been transmitted completely, the second row data of the left search window SL starts to be transmitted accompanied by transmitting the right search window SR. For example, at timing T5, the element data of (1,0), (1,1), (1,2) and (1,3) in the left search window SL and the element data of (1,0), (1,1), (1,2) and (1,3) in the current block CU are parallel input into the motion estimation circuit 500 from the input ends SL1~SL4 and the input ends CU1~CU4, respectively. Meanwhile, four element data of (0,0), (0,1), (0,2) and (0,3) in the right search window SR start to be parallel input into the motion estimation circuit 500 from the input ends SR1~SR4, respectively, and analogically for the rest.

In the motion estimation circuit 500, the latch module has 4 pieces of shift registers, which are formed by latches FF11~FF14, FF21~FF24, FF31~FF34 and FF41~FF44, respectively. Each shift register according to a timing receives the data from the input ends CU~CU4 and delivers the received data to next stage, respectively. Wherein, each latch is a D-type flip-flop.

The processing module has a plurality of processing elements PE01~PE44 and each processing element simultaneously receives the left search window data SL and the right search window data SR for performing similarity degree operations, for example, sum of absolute difference operations (SAD operations). Note that although only the input ends for the processing element PE01 in FIGS. 5A and 5B are marked and the rest processing elements PE11~PE44 are not indicated, all blocks representing the processing elements PE01~PE44 are similar circuits. In other words, the names and definitions of the corresponding input/output ends for the processing elements PE01~PE44 are the same. A more detailed description in regard to the internal circuits of the processing elements PE01~PE44 would be explained through the processing element PE01 referring to FIG. 7 hereinafter.

In FIGS. 5A and 5B, all the processing elements are divided into 5 groups: the 0-th group is formed by the processing element PE01, the $1^{st}$ group is formed by the processing elements PE11~PE14, the $2^{nd}$ group is formed by the processing elements PE21~PE24, the $3^{rd}$ group is formed by the processing elements PE31~PE34 and the 4th group is formed by the processing elements PE41~PE44. Except for the 0-th group where the processing element PE01 is directly coupled to the input ends CU1~CU4, the rest groups are coupled to the input ends and the output ends of the corresponding stage of latches in each shift register, respectively. Taking the $1^{st}$ group as exemplary, the input end C1 of the processing element PE11 is coupled to the output end of the latch FF41 and the input ends C2~C4 thereof are coupled to the input ends of the latches FF11, FF21 and FF31, respectively. The input ends C1~C2 of the processing element PE12 are coupled to the output ends of the latches FF31 and FF41, respectively, and the input ends C3~C4 thereof are coupled to the input ends of the latches FF11 and FF21, respectively. The input ends C1~C3 of the processing element PE13 are coupled to the output ends of the latches FF21 and FF41, while the input end C4 thereof is coupled to the input end of the latch FF11. The input ends C1~C4 of the processing element PE14 are coupled to the output ends of the latches FF11, FF21, FF31 and FF41, respectively. Similarly, the processing elements of the rest groups are coupled to the input ends and the output ends of the corresponding latches as shown in FIGS. 5A and 5B.

Each processing element receives the corresponding current block data CU according to a timing, the corresponding left search window data SL and the corresponding right search window data SR, followed by comparing the similarity degrees between the corresponding candidate block and the current block for outputting processing results SAD01~SAD44, respectively. The comparing unit 530 receives and compares all the processed results SAD01~SAD44 from the processing elements PE01~PE44 and then outputs a comparison result 501.

Figure 7:
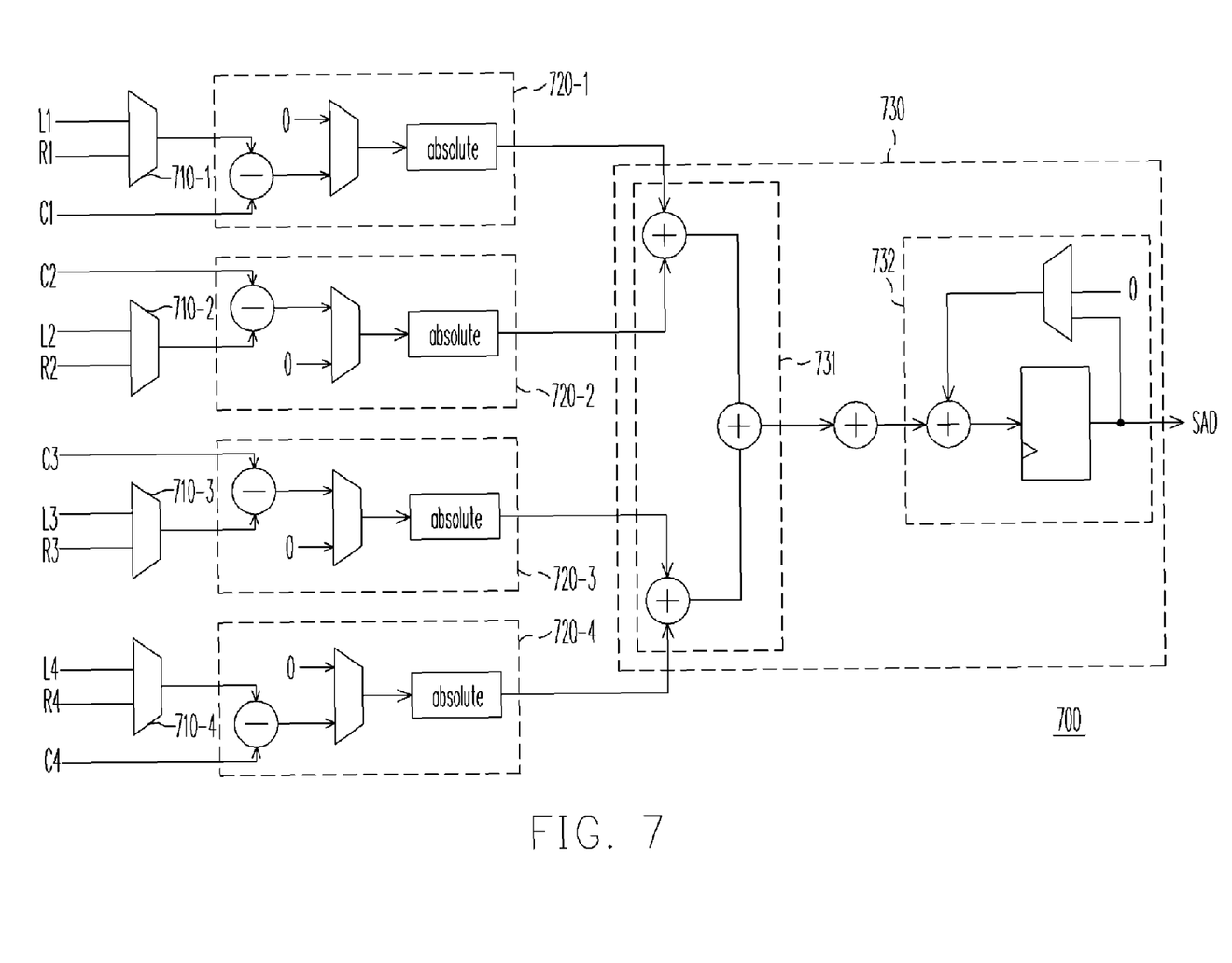
FIG. 7 is a circuit block diagram of a motion estimation processing element according to another embodiment of the present invention.

In the embodiment, anyone of the above-described processing elements PE01~PE44 can be implemented referring to FIG. 7 and only the processing element PE01 in FIG. 5A is explained herein. FIG. 7 is a circuit block diagram of a motion estimation processing element according to another embodiment of the present invention. Referring to FIG. 7, a processing element 700 (equivalent to the processing element PE01 in FIG. 5A, for example) includes selectors 710-1~710-4, operation circuits 720-1~720-4 and an accumulation circuit 730. The selectors 710-1~710-4 receive and select the left search window data SL from the input ends L1~L4 and the right search window data SR from the input ends R1~R4 for outputting the selected data, respectively.

The operation circuits 720-1~720-4 receive the selected data from the corresponding selectors 710-1~710-4 and the current block data CU (from the corresponding input ends C1~Cn) to perform absolute difference operations (AD operations), respectively, and output the operation results, respectively. Since the operation circuits 720-1~720-4 are the same as the operation circuits 220-1~220-n in FIG. 2; the description is omitted for simplicity.

The accumulation circuit 730 receives all the operation results from the operation circuits 720-1~720-4 and accumulates the received results until the operation results of the whole current block are obtained, and at the point, the processed result SAD01 is output. As shown in FIG. 6, at timing T65, the processing element PE01 outputs a final operation result sad0. Besides, since the processing elements PE11~PE14 of the $1^{st}$ group need to wait for the output data from the first stage of the latches FF11, FF21, FF31 and FF41, therefore the processing elements PE11~PE14 of the $1^{st}$ group would delay for one clock cycle period in comparison with the 0-th group to obtain the final operation results sad1~sad4 (at timing T66 shown in FIG. 6). Similarly, since the processing elements PE21~PE24 of the $2^{nd}$ group need to wait for the output data from the second stage of the latches FF12, FF22, FF32 and FF42, therefore the processing elements PE21~PE24 of the $1^{st}$ group would delay for two clock cycle periods in comparison with the 0-th group to obtain the final operation results.

The above-described accumulation circuit 730 includes, for example, an adder 731 and an accumulation latch circuit 732. The adder 731 receives all the operation results from the operation circuits 720-1~720-4, followed by performing addition operations to output a first sum value. Wherein, the adder 731 can follow an adder-tree architecture to sequentially accumulate all the operation results from the operation circuits 720-1~720-4 for getting the final first sum value. The latch circuit 732 receives the final first sum value from the adder 731 and adds the received value to the previous processed result SAD registered in the accumulation latch circuit 732 for outputting a current processed result SAD (for example, the processed result SAD01 in FIG. 5A). The accumulation latch circuit 732 can be the same as the accumulation latch circuit 232 in FIG. 2; therefore, the description is omitted for simplicity.

Figure 8:
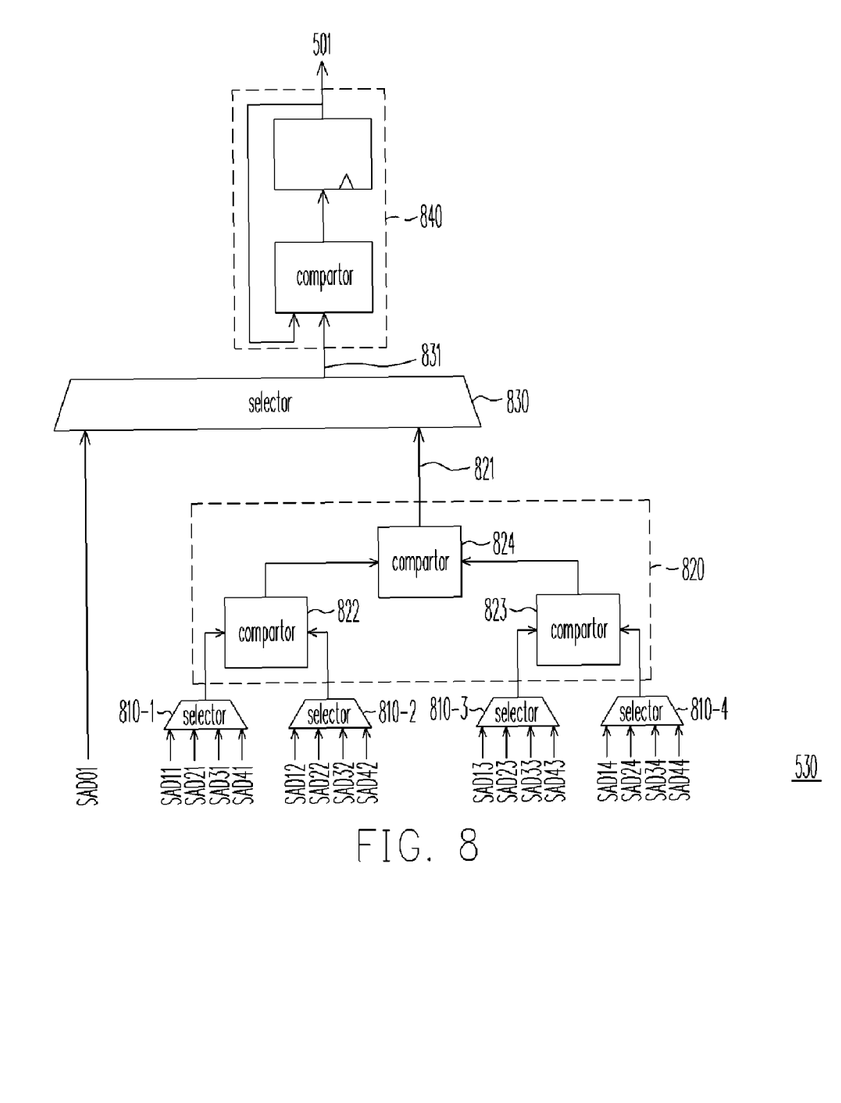
FIG. 8 is a circuit block diagram of the comparing unit in FIGS. 5A and 5B according to another embodiment of the present invention.

In the present embodiment, the comparing unit 530 in FIGS. 5A and 5B can be implemented referring to FIG. 8. FIG. 8 is a circuit block diagram of the comparing unit 530 in FIGS. 5A and 5B according to another embodiment of the present invention. Referring to FIG. 8, the comparing unit 530 includes first selectors 810-1~810-n, a first comparator 820, a second comparator 830 and a latch comparator 840. Each of the first selectors 810-1~810-n receives and selects all the processed results output from the corresponding processing elements of every group of processing elements (except for the 0-th group), followed by outputting the selected processed result. For example, the first selector 810-1 is coupled to the first processing elements of all the groups of all processing elements (i.e. the processing elements, PE11, PE21, PE31 and PE41 in FIGS. 5A and 5B) and receives the processed results SAD11, SAD21, SAD31 and SAD41. Similarly, the first selector 810-2 is coupled to the second processing elements of all the groups of processing elements (i.e. the processing elements, PE12, PE22, PE32 and PE42 in FIGS. 5A and 5B) and receives the processed results SAD12, SAD22, SAD32 and SAD42 and analogically for the rest.

The first comparator 820 receives the processed results selected by and output from the first selectors 810-1~810-4 for outputting a comparison result 821. For example, the comparator 822 is used to compare and output the processed results selected by and output from the first selectors 810-1~810-2; meanwhile, the comparator 823 is used to compare the processed results selected by and output from the first selectors 810-3~810-4 for getting a minimal value and outputs the minimum value. Afterwards, the comparator 824 compares the output from the comparator 822 with the output from the comparator 823 for getting a minimal value and outputs the minimal value.

The second selector 830 receives and selects the processed result SAD01 from the processing element of the 0-th group (PE01 in FIG. 5A) and the comparison result 821, followed by comparing them for outputting a selection result 831. The latch comparator 840 receives the selection result 831, compares the received result 831 with the previous comparison result 501 registered in the latch comparator 840 for getting a smaller one and outputs a current comparison result 501. Here, the latch comparator 840 can be the same as the accumulation latch circuit 340 in FIG. 3 and the description is omitted for simplicity.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A motion estimation circuit, used for searching a block most similar to a current block in a search window, wherein the search window comprises a left search window and a right search window; the motion estimation circuit comprising:

a latch module, having n pieces of shift registers, wherein each of the shift registers has m stages of latches and is used for receiving current block data and transmitting the received current block data to next stage according to a timing, wherein n is an integer larger than 1 and m is an integer larger than 0;

a processing module, having a plurality of processing elements, wherein each of the processing elements receives left search window data and right search window data, wherein the processing elements are divided into (m+1) groups for coupling the corresponding latches of all the stages in the shift registers, wherein the processing elements of the i-th group are coupled to the output ends of the i-th stage of latches in the corresponding shift registers and the input ends of the i-th stage of latches in the corresponding shift registers, wherein i is an integer larger than 0 but smaller than or equal to m, and each of the processing elements is used for comparing the similarity degree between a corresponding candidate block in the search window and the current block and outputs a processed result, respectively, and each of the processing elements comprises:

n pieces of selectors, used for receiving and selecting the left search window data and the right search window data, respectively, and for outputting a selected data, respectively;

n pieces of operation circuits, coupled to the corresponding selectors, respectively, and used for receiving the selected data and the current block data to perform an absolute difference (AD) operation and for outputting an operation result, respectively; and a plurality of accumulation circuits, each of the accumulation circuits coupled to the operation circuits and used for receiving and accumulating the operation results of the operation circuits for outputting a processed result; and a comparing unit, coupled to the processing module and used for receiving and comparing the processed results of the accumulation circuits for outputting a first comparison result.

2. The motion estimation circuit as recited in claim 1, wherein the latches are flip-flops.

3. The motion estimation circuit as recited in claim 1, wherein the processing module receives the left search window data, the right search window data and the current block data to perform sum of absolute difference (SAD) operations on the corresponding candidate blocks in the search window and the current block.

4. The motion estimation circuit as recited in claim 1, wherein each of the operation circuits comprises:
a subtractor, used for receiving the selected data and the current block data to perform a subtraction operation for outputting a subtraction result;
a first multiplexer, coupled to the subtractor and used for selecting one of a '0' data or the subtraction result for outputting a selected result; and
an absolute value circuit, coupled to the first multiplexer and used for receiving the selected result and performing an absolute value operation to output the operation result.

5. The motion estimation circuit as recited in claim 1, wherein the accumulation circuit comprises:
a first adder, used for receiving the operation results and performing addition operations for outputting a first sum value; and
an accumulation latch circuit, coupled to the first adder and used for receiving the first sum value and the previous processed result registered in the accumulation latch circuit to perform addition operations for outputting the current processed result.

6. The motion estimation circuit as recited in claim 5, wherein the accumulation latch circuit comprises:
a second multiplexer, used for receiving and selecting either the '0' data or the processed result for outputting a selected result;
a second adder, used for receiving the selected result and the first sum value to perform addition operations for outputting a second sum value; and
a flip-flop, coupled to the second adder and used for receiving and registering the second sum value to output the processed result.

7. The motion estimation circuit as recited in claim 1, wherein the comparing unit is used for receiving and comparing the processed results output from the processing elements according to a timing, wherein the processing results indicate the similarity degrees between the current block and the corresponding candidate blocks, respectively, for selecting and outputting one with the highest similarity degree from the processed results.

8. The motion estimation circuit as recited in claim 7, wherein the comparing unit comprises:
n pieces of first selectors, wherein each of the first selectors is used for receiving and selecting the processed results output from the corresponding processing element in the processing elements of every group and for outputting the selected processed result;
a first comparator, coupled to the first selectors and used for receiving and comparing the processed results output from and selected by the first selectors to output a second comparison result;

a second selector, coupled to the first comparator and used for receiving and comparing the processed result outputted from the processing element of the 0-th group and the second comparison result to output a selected result; and
a latch comparator, coupled to the second selector and used for receiving the selected result and the previous first comparison result registered in the latch comparator for outputting the current first comparison result.

9. The motion estimation circuit as recited in claim 8, wherein the latch comparator comprises:
a second comparator, used for receiving and comparing the first comparison result and the selected result for outputting a third comparison result; and
a flip-flop, coupled to the second comparator and used for receiving and registering the third comparison result for outputting the first comparison result.

10. A motion estimation processing element, used for computing the similarity degree between a candidate block in a search window and a current block and outputting a processed result, wherein the search window comprises a left search window and a right search window; the motion estimation processing element comprising:
n pieces of selectors, used for receiving and selecting the left search window data and the right search window data, respectively, and for outputting a selected data, respectively, wherein n is an integer larger than 1;
n pieces of operation circuits, coupled to the corresponding selectors, respectively, and used for receiving the selected data and the current block data to perform an absolute difference (AD) operation and for outputting an operation result, respectively; and
an accumulation circuit, coupled to the operation circuits and used for receiving and accumulating the operation results for outputting the processed result, wherein each of the operation circuits comprises:
a subtractor, used for receiving the selected data and the current block data to perform a subtraction operation for outputting a subtraction result;
a first multiplexer, coupled to the subtractor and used for selecting either a '0' data or the subtraction result for outputting a selected result; and
an absolute value circuit, coupled to the first multiplexer and used for receiving the selected result and performing an absolute value operation to output the operation result.

11. The motion estimation processing element as recited in claim 10, wherein the accumulation circuit comprises:
a first adder, used for receiving the operation results and performing addition operations for outputting a first sum value; and
an accumulation latch circuit, coupled to the first adder and used for receiving the first sum value and the previous processed result registered in the accumulation latch circuit to perform addition operations for outputting the current processed result.

12. The motion estimation processing element as recited in claim 11, wherein the accumulation latch circuit comprises:
a second multiplexer, used for receiving and selecting either the '0' data or the processed result for outputting a selected result;
a second adder, used for receiving the selected result and the first sum value to perform addition operations for outputting a second sum value; and
a flip-flop, coupled to the second adder and used for receiving and registering the second sum value to output the processed result.

\* \* \* \* \*